Inventors:
Paul Weber
Horst Ritzmann
Hans Mollenkopf

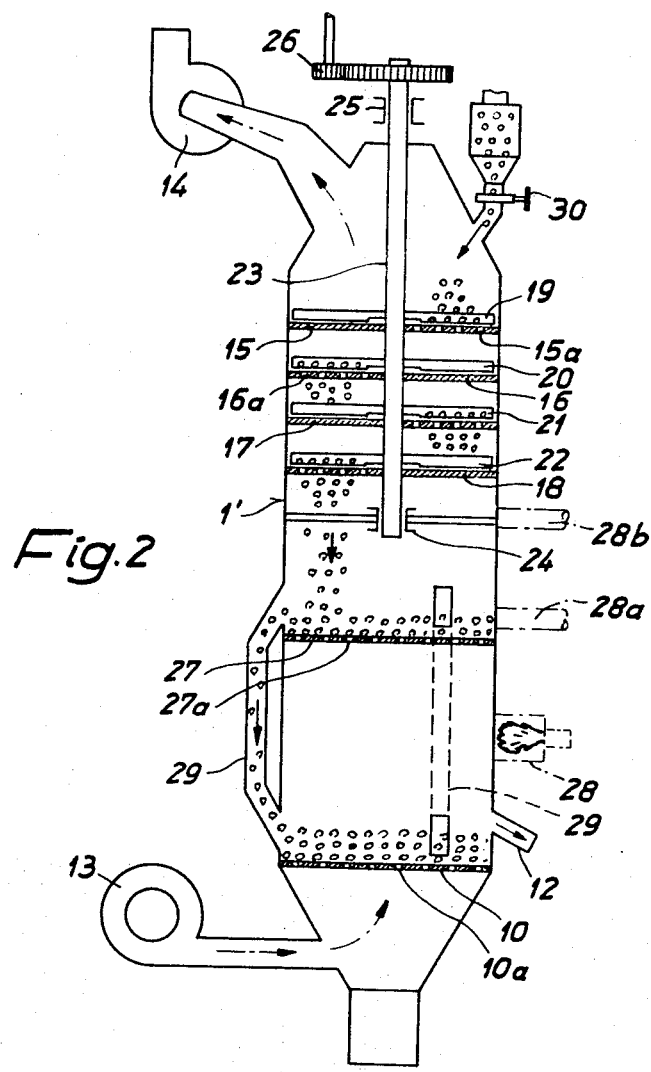

United States Patent Office 3,409,450
Patented Nov. 5, 1968

3,409,450
METHOD OF AND APPARATUS FOR
MAKING POROUS CLAY
Paul Weber, Oelde, Westphalia, and Horst Ritzmann and Hans Mollenkopf, Neubeckum, Westphalia, Germany, assignors to Polysius G.m.b.H., Neubeckum, Westphalia, Germany
Filed Mar. 24, 1965, Ser. No. 442,329
Claims priority, application Germany, Mar. 26, 1964, P 33,918
6 Claims. (Cl. 106—40)

ABSTRACT OF THE DISCLOSURE

The present invention relates to a method of making porous or bloated clay and is characterized primarily by the steps of providing clearly separate preheating and firing zones respectively in said preheating zone drying and preheating the clay material from which the porous clay is to be made up to a temperature slightly below the temperature at which an inflation or bloating of said clay material will occur, subsequently dropping from said preheating zone into said firing zone over a distance only such preheated clay material which has been heated to approximately the same temperature slightly below the temperature at which an inflation or bloating of the clay material will occur while during said drop quickly firing said material so as to inflate or bloat said material, and at the end of said drop cooling the thus obtained product.

---

Figure 1:
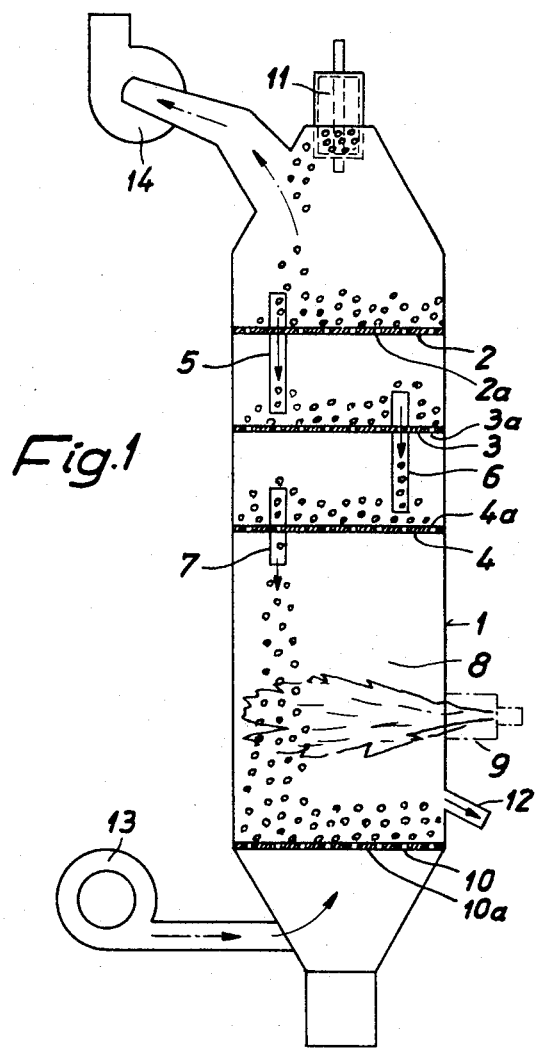

The present invention relates to a method of making porous clay, according to which the material is dried and preheated in a preheating zone and is subsequently briefly fired in a firing zone whereby the material is inflated. Finally, the material is cooled in a cooling zone.

When rapidly heated, certain naturally occurring raw materials with or without additions such as clay, argillite, glauconite, etc., or mixtures of these materials, greatly increase in volume and acquire a porous, bubbly structure which permits the employment of such material as insulators and fillers.

It is known to make such porous clay in rotary kilns, the raw material being heated to temperatures between 1100 and 1300 C. This method of producing porous clay, however, easily causes difficulties inasmuch as the upper layers of the material which are exposed to the flames have the tendency to stick and thereby to effect the heat transfer to the material lying therebelow. Consequently, porous clay produced in customary rotary kilns is rather irregularly inflated or swelled and has a relatively high weight per quart.

In an effort to overcome the above-mentioned drawbacks, high speed rotary kilns have been employed in which teeth or ribs are provided in the firing zones for continuously lifting the portions of the material and to allow them to drop onto the material therebelow. In this way the material will briefly pass through the hot firing gases, whereby a good inflating effect will be obtained.

However, an important disadvantage of making porous clay in rotary kilns consists in that such installations require considerable capital expenditure, which is reflected in high manufacturing costs for the finished product.

It is, therefore, an object of the present invention to provide a method of making porous clay, which will overcome the above-mentioned drawbacks.

It is another object of this invention to provide a method of making porous clay which will improve the quality of the porous clay over heretofore known porous clay while simultaneously reducing the costs of making the same.

It is also an object of the present invention to provide a method of making porous clay which will yield a substantially uniformly grained end product.

Still another object of the present invention consists in the provision of a method of making porous clay which will yield a porous clay that is, for all practical purposes, free of dust.

These and other objects and advantages of the invention will appear more clearly from the following specification in connection with the accompanying drawings, in which:

FIGURE 1 diagrammatically illustrates a shaft kiln for carrying out the method according to the present invention;

FIGURE 2 shows a modified shaft kiln for carrying out the method of the present invention.

The present invention is characterized primarily in that the making of porous clay is effected in a shaft kiln, in which the material in a preheating zone located within the upper range of the shaft kiln is preheated up to a temperature slightly below inflation temperature and is then quickly and suddenly transferred from the preheating zone into a firing zone and from the latter into a cooling zone. In connection with the production of porous clay, it is important that the material will quickly reach its inflation temperature, will be held briefly at this temperature, and will subsequently be cooled quickly. Only when these requirements are met will there be obtained a substantially uniform highly inflated, porous clay which will not burst and collapse during the cooling phase. It is thus important for the method according to the invention, that the material in the preheating zone of the shaft kiln is heated slightly below inflating temperature so that the material can in the subsequent firing zone be quickly brought to inflation temperature. In this connection, it is of particular importance that the transfer of the material from the preheating zone into the firing zone, and from the firing zone into the cooling zone, be effected suddenly. This is possible in a shaft kiln in contrast to a rotary kiln. Due to this sudden transfer from the preheating zone to the firing zone, the quick temperature increase is obtained which is vital for the formation of a good porous clay. According to a particularly advantageous further development of the method according to the present invention, the heating of the material in the preheating zone and the heating of the material in the firing zone and/or the cooling of the material in the cooling zone, is carried out according to the turbulence layer or fluidized bed process.

Referring now to the drawing in detail, the shaft kiln 1 illustrated therein has its upper portion provided with a preheating zone comprising three turbulence beds 2, 3 and 4 in superimposed spaced relationship to each other. These beds are provided with apertures or perforations 2a, 3a and 4a for the passage of air therethrough. Said beds are also provided with down-pipes 5, 6 and 7 respectively through which the material is conveyed downwardly from one bed to another bed and out of the preheating zone into the firing zone, generally designated 8.

Firing zone 8 has its side wall provided with a plurality of burners 9 (one only being shown) which may be burners operating on solid, liquid, or gaseous fuels.

The lower portion of shaft kiln 1 comprises a turbulence or fluidized bed 10 which forms the cooling zone and is provided with perforations or apertures 10a for the passage of air therethrough.

The material to be processed is introduced into the kiln, for instance through a screen mill 11, and leaves the kiln through an outlet 12. Cooling air is conveyed by means of a blower 13 below and through bed 10, whereas the heating gases are withdrawn from the kiln by a fan 14 at the upper end of the kiln.

Operation of apparatus of FIG. 1

The apparatus shown in FIG. 1 is operated in the following manner. Material introduced into the upper end of shaft kiln 1 is first dried in the preheating zone comprising turbulence beds 2, 3 and 4 and is heated up to a temperature slightly below the inflation temperature. The material remains on the individual beds or in the individual sections of the preheating zone until, due to the evaporation of the humidity therein, the material has become sufficiently light and has risen to the surface of the respective turbulence, so that the material will be conveyed through the respective down-pipe 5, 6 to the downwardly next following zone section.

After the material has left the lowermost turbulence layer of the preheating zone, the material is through down-pipe 7 conveyed into the firing zone which is passed through by the hot flame gases of burner 9. In this way the material comes into a brief but highly intensive contact with the hot flame gas and thereby is quickly and uniformly inflated.

Subsequently, the material drops onto the fluidized bed 10 where it is quickly cooled before leaving the shaft kiln through outlet 12. This cooling is effected by the cooling air furnished by blower 13 and flowing as secondary air to burner 9.

Embodiment of FIG. 2

FIG. 2 diagrammatically illustrates a shaft kiln 1' in which the preheating zone is formed by a number of superimposed hearths 15, 16, 17 and 18 arranged in vertically spaced relationship to each other. Said hearths are on alternately opposite sides provided with drop-holes 15a, 16a for the passage of the material. Arranged above said hearths are rotatable rabble arms 19, 20, 21 and 22 connected to a common main shaft 23. Shaft 23 is journalled in bearings 24, 25 and is adapted to be rotated through the intervention of a gear train 26, 26a.

The firing zone of kiln 1' is formed by a turbulence or fluidized bed 27 which is provided with apertures 27a for the passage of the heating gases. Below bed 27 there are provided burners 28, while additional burners 28a, 28b may be arranged above bed 27, as indicated in dot-dash lines in FIG. 2. Firing can thus take place in the turbulence layer on bed 27 or outside the same. For discharging the material from bed 27 there are provided down-pipes 29 at the wall portion of the kiln.

As with the previously described embodiment of FIG. 1, also with the embodiment of FIG. 2, the cooling zone located in the lower part of the kiln comprises a turbulence or fluidized bed 10 provided with apertures 10a for the passage of cooling air delivered by blower 13. The heating gases are at the upper end of the kiln withdrawn by a suction fan 14. The charge of the material into the kiln is effected at the upper end thereof through a shutoff device 30. The material leaves the kiln through outlet 12.

Operation of the apparatus according to FIG. 2

The material charged into kiln 1 is first dried on hearths 15, 16, 17 and 18 and is heated up to a temperature slightly below the inflating temperature, while at the same time the material is mechanically stirred and loosened up by rotating rabble arms 19, 20, 21 and 22.

Subsequently, the material passes into the firing zone and the bed 20 is strongly inflated by the hot flame gases of burners 28. The less inflated and heavier particles of the material are first found in the lowest part of the turbulence layer and, with increasing inflation, rise upwardly until eventually they pass through down-pipes 29 into the cooling zone. In this cooling zone the material particles are quickly cooled and subsequently are discharged from kiln 1' through outlet 12.

The method according to the present invention as set forth above, yields new and rather surprising results. Inasmuch as the specific weight of the porous clay decreases with increasing inflation, the not-yet-sufficiently inflated and heavier particles of the material will remain in the turbulence layer of the firing zone until they are sufficiently inflated by the hot gasses passing therethrough, and thus have become lighter in weight. Subsequently, said material particles move upwardly and are discharged through the outlet 12. The employment of the turbulence layer method thus yields the possibility of producing an extremely uniform porous clay inasmuch as the stay and temperature of the material in the turbulence layer can be adjusted very precisely, so that an optimum low weight per quart of porous clay can be obtained.

The method according to the invention furthermore has the advantage that when the charged pieces are of substantially the same size, a uniformly grained end product will be obtained.

The employment of the turbulence layer method for the manufacture of porous clay also has the advantage that the gases flowing through the turbulence bed will entrain dust which can be separated from the gases after their discharge from the kiln. In this way, a porous clay will be obtained which is practically free of dust.

EXAMPLE

Clay, the inflation or swelling properties of which have been determined by experiments, is introduced into the uppermost zone of the kiln according to FIG. 1 with a moisture content of from 10 to 15% and a granular size of from 5 to 10 millimeters. In this uppermost zone the clay is dried and is in the subsequent pre-heating zones heated to about 1000° C., i.e., slightly below the inflation temperature of the clay. Subsequently the clay is rapidly introduced into the firing zone and from there into the cooling zone of the kiln.

It is, of course, to be understood that the present invention is, by no means, limited to the particular arrangements and methods set forth above, but also comprises any modifications within the scope of the appended claims. Thus, it is to be understood that the quantity of fuel introduced into the firing zone depends on the caloric value and the inflation temperature of the clay and may vary within wide limits depending on the material processed.

It is furthermore to be understood that all solid, liquid or gaseous fuels may be employed in the apparatus according to the invention. The quantity of cooling air blown into the kiln depends, of course, to a large degree on the amount of fuel employed in the firing zone of the kiln.

What we claim is:

1. In a method of making porous clay, the steps of: providing vertically separated preheating, firing and cooling zones, respectively, depositing the clay material in layers in said preheating zone, preheating said material to slightly below inflation temperature while creating turbulence in the material in said layers dropping the material while heated from said preheating zone to said firing zone and heating to above inflation temperature, and dropping said material immediately into said cooling zone and passing cooling air through said material to cool said material.

2. The method as claimed in claim 1, in which said turbulence in said material in said preheating zone is produced by passing heated gas through the layers of material.

3. The method as claimed in claim 2, in which the lighter material is carried above the layers after preheating and is dropped through a passage to the firing zone.

4. The method as claimed in claim 1, in which said turbulence in said material in said preheating zone is provided by mechanical stirring.

5. The method as claimed in claim 1, in which the lighter material after preheating is deposited in a layer through which passes gas heated above the inflation temperature.

6. The method as claimed in claim 1, in which the material in said cooling zone is deposited in a layer through which passes cooling gas to cool the material immediately after leaving said firing zone.

References Cited

UNITED STATES PATENTS 2,676,892   4/1954   McLaughlin _____ 106—72

JAMES E. POER, *Primary Examiner.*